March 6, 1945.   H. T. KRAFT   2,370,972
APPARATUS FOR RETREADING TIRES
Filed July 15, 1942   2 Sheets-Sheet 1
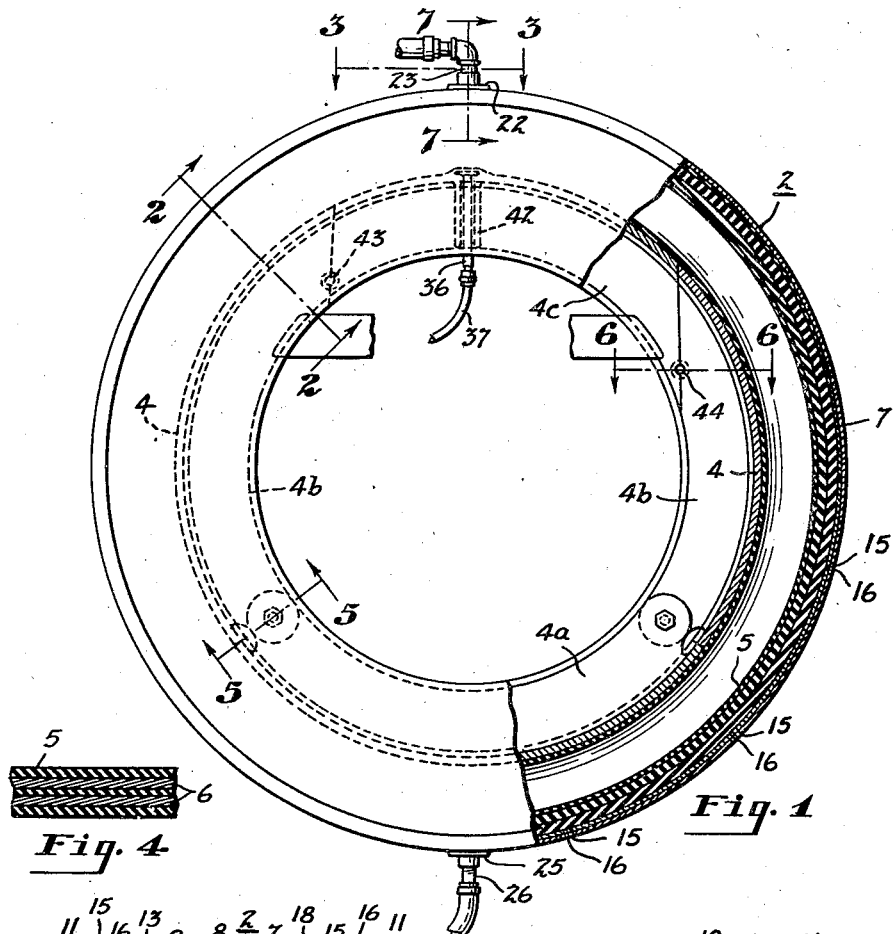
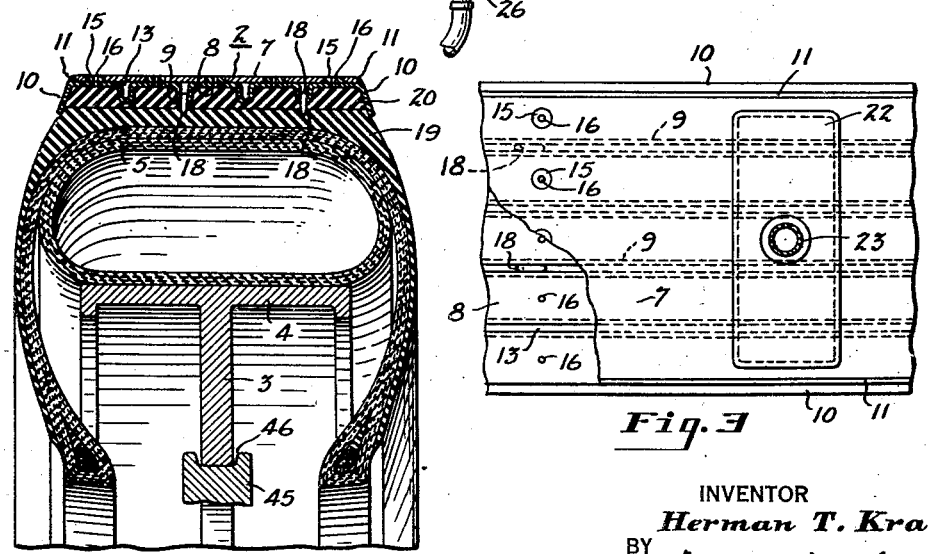
INVENTOR
*Herman T. Kraft*
BY *Evans + McCoy*
ATTORNEYS March 6, 1945. H. T. KRAFT 2,370,972
APPARATUS FOR RETREADING TIRES
Filed July 15, 1942 2 Sheets-Sheet 2

INVENTOR
Herman T. Kraft
BY Evans + McCoy
ATTORNEYS

Patented Mar. 6, 1945

2,370,972

UNITED STATES PATENT OFFICE 2,370,972

APPARATUS FOR RETREADING TIRES

Herman T. Kraft, Akron, Ohio, assignor to The General Tire & Rubber Company, Akron, Ohio, a corporation of Ohio Application July 15, 1942, Serial No. 450,978

3 Claims. (Cl. 18—18)

This invention relates to an improved method and apparatus for retreading tire casings such as those used on motor vehicles and the like.

In the retreading of vehicle tires it is desirable that the tread portion only of the tire be subjected to vulcanizing heat and that the side walls of the tire be free from contact with the mold. It is also desirable that a relatively flat vulcanizing mold be provided so that a single mold may be utilized for tires of different widths and diameters. When the retreading mold does not extend over the side walls of the tire, however, difficulty has been experienced in attaining high pressure at the side edges or shoulder portions of the tread being supplied to the tire. In order to obtain high pressure at the side edge portions of the tread, it has heretofore been proposed to mount the tire on a rim of appropriate size and to squeeze the side walls together with exterior annular plates, so that the shoulder portion of the tire is increased in diameter sufficiently to form a seal with the side edges of the mold.

It is an object of the present invention to provide a method of retreading tires wherein a relatively flat vulcanizing mold may be used and wherein the high pressure at the side edge portions may be effected without mounting the tire on a rim and without the use of side plates adapted to squeeze the tire casing into a flat section.

It is another object of the present invention to provide apparatus for retreading tires which permits maintainment (and without pressure on the side walls of the casing beyond the shoulders of a seal at the side edges of newly applied tread) without the use of side plates adapted to squeeze the side walls of the tire together in opposition to inflation pressure.

Another object of the present invention is to provide a method of retreading tires wherein the tire casing remains centered with respect to the mold during and after the period of flow in the tread or camel back as it conforms to mold shape.

It is a further object of the present invention to provide apparatus which is adapted to hold the tire casing centered with respect to the mold during and after the period of adjustment of the tire due to flow of rubber in forming the tread design.

It is a still further object of the present invention to provide apparatus capable of effecting a high pressure at the side edge portions of the tread without requiring the tire to be mounted on a rim during the retreading operation and without requiring pressure side plates over the side walls of the tire.

It is a still further object of the present invention to provide apparatus for retreading tires wherein the added tread may be readily centered upon the tire casing.

Other objects will be apparent from the following detailed description of the invention as illustrated by the accompanying drawings, wherein:

Figure 1 is a side elevational view, with parts broken away, of apparatus embodying the present invention with a tire in vulcanizing position with an air bag positioned therein, portions of said tire casing and air bag being broken away;

Fig. 2 is a cross sectional view on the line 2—2 of Fig. 1;

Fig. 3 is a top elevational view of a portion of the apparatus as seen from the line 3—3 of Fig. 1;

Fig. 4 is an enlarged sectional view of a portion of a wall of an air bag that may be utilized in the practice of the invention;

Figure 5:
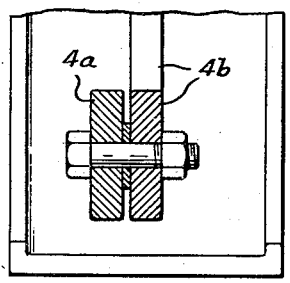
Fig. 5 is a sectional view of a section through a portion of the apparatus taken on the line 5—5 of Fig. 1.
Figure 6:
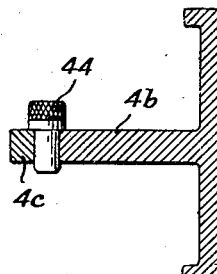
Fig. 6 is a sectional view of the inner supporting member taken on the line 6—6 of Fig. 1 and showing the means of locking the component parts thereof.
Figure 7:
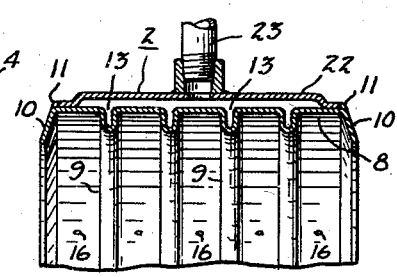
Fig. 7 is a sectional view through the outer mold member taken on the line 7—7 of Fig. 1.

In accordance with the present invention, tread material is applied to the crown portion of the tire casing and the tire is incorporated within a mold having less diameter than the normal diameter of the treaded tire casing. A rigid, relatively wide backing or supporting member, having an air bag supporting portion with a diameter substantially larger than the diameter of the beads of the tire casing, is incorporated or assembled within the tire casing, with the supporting surface preferably about midway of the side walls. Fluid pressure is then applied within a sealed space, or within a suitable container situated between the outer supporting surface of the backing member and the crown portion of the tire, to cause the tread portion of the tire casing to be forced strongly against the inner walls of the mold, without the necessity of applying pressure externally of the side walls of the tire, tending to force them toward each other and thus cause radial extension of the shoulder portions of the tire. The pressure container is maintained in a longitudinally flattened condition so that inflation pressure tends to increase its diameter but has substantially no tendency to cause increased separation of the side walls.

The mold used in the practice of the present invention preferably is of the generally cylindrical type with internally projecting, tread design-forming members. The tire may be incorporated in the mold in any suitable manner. The side walls of the casing may be spread laterally at circumferentially spaced points, or the central portion of the side walls may be moved apart and the beads simultaneously moved together so as to contract the diameter of the crown portion of the tire casing.

Referring more particularly to the drawings in which like parts are designated by the same numerals of reference throughout the several views, the apparatus of the present invention comprises a tread forming mold or matrix 2, which should preferably be of smaller diameter than the diameter of the tire casing being retreaded, an inner collapsible supporting or backing member having a supporting portion 4 with a relatively wide supporting surface, and an air bag 5 having a plurality of relatively inextensible elements 6 embedded within the side walls thereof.

The mold 2 may comprise an outer, substantially cylindrical backing portion 7 which may be of flexible sheet metal, and an inner generally cylindrical portion 8. The inner portion 8 is welded to the backing portion 7 at suitable points and is provided with a plurality of inwardly directed protuberances such as the annular ribs 9 which are adapted to form the tread design. An inwardly directed, tread-defining flange 10 is disposed at each side of the mold 2 and is adapted to assist in forming a seal between the tire tread or sides and the side edges of the mold. The outer backing portion 7, which is shown as of cylindrical shape, and the inner, generally cylindrical portion 8 of the mold, are preferably formed in annular shape from sheet steel. The flanges 10 preferably may be integral with the inner portion 8 and the inner and outer members are strongly welded together along their entire side edges by weld material 11.

Means is provided for heating the mold matrix 2, or at least the inner member 8 thereof, to cause vulcanization of the tire tread in contact therewith. One or more substantially annular cavities 13 may be formed between the members 7 and 8 for circulation of heating fluid, such as steam or hot water. The spaced tread-design protuberances 9 may be hollow, annular ribs of U-shaped cross section to provide spaced cavities 13 over the width of the mold. To prevent spreading of the members 7 and 8 when fluid pressure is applied to cavities 13, reinforcing means such as weld portions 15 are provided for maintaining the central portions of the members 7 and 8 in substantial contact and for fastening them together at spaced intermediate portions. The weld portions 15 are preferably distributed in spaced relation over the mold between the protuberances 9 and may be formed by drilling suitable holes and filling the same with weld material. To provide conventional vents and thus prevent entrapment of air in the mold, small holes 16 may be drilled through the welded portions 15 and through the inner member 8.

Means such as a plurality of inwardly projecting pins 18 carried by the inner mold portion 8, preferably at the protuberances 9, are provided for maintaining alignment of the tire casing 19 during and after the molding of the tread material 20. The aligning pins 18 may be suitably attached to the protuberances or ribs 9 by drilling holes therethrough and fastening the pins or nails 18 within the holes. The length of the pins 18 is preferably such that they extend into the tire casing substantially to carcass depth. An upper header 22 having a cavity which connects with the spaced cavities 13 and having a conduit 23 connected therewith and to a suitable heating fluid supply, such as a boiler (not shown), is provided to permit entrance of heating fluid into the cavities 13 for vulcanization of the tread material 20. A similar header portion 25 having a cavity connected with the lower portion of the annular cavities 13 and having a conduit 26 connected therewith is provided for egress of condensed steam or egress of heating fluid, as desired.

Figure 10:
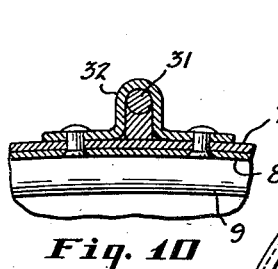
Fig. 10 is a sectional view of a portion of the mold taken on the line 10—10 of Fig. 9 of apparatus with a tire and an air bag therein.
Figure 8:
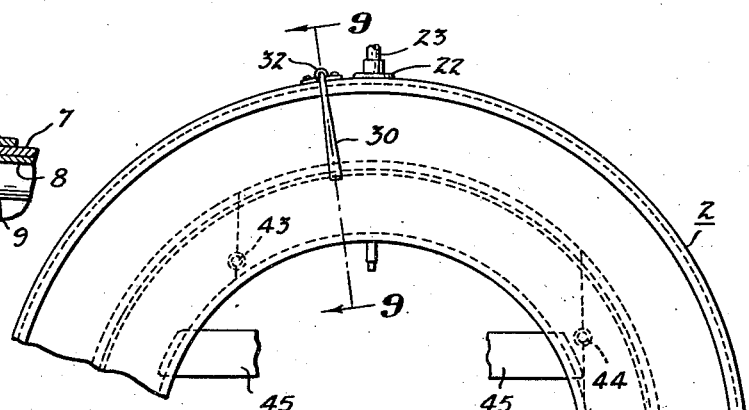
Fig. 8 is a side elevational view of a slightly modified form of apparatus with a tire and air bag therein.
Figure 9:
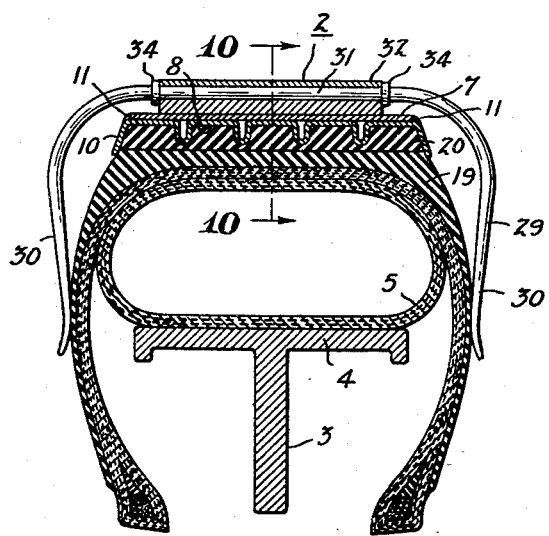
Fig. 9 is a cross sectional view on the line 9—9 of Fig. 8.

In the modification shown in Figs. 8 to 10, inclusive, the aligning means comprises U-shaped spring clamps 29, which are located at circumferentially spaced points over the mold. The clamps 29 have arms 30 at each end thereof which are adapted to contact the side wall of the tire and position it with respect to the mold. The central portion 31 of the clamps 29 is journaled within the mold fastening portion 32, which is rigidly attached to the outer mold member 7. Means such as thrust washers 34 carried integrally with the clamps 29 are provided for cooperating with the member 32 to retain the clamp centered with respect to the mold, so that the tire casing 19 is held in alignment.

The air bag 5 is preferably molded in an annular shape with an oblong cross section having greater width than height, substantially as shown in the drawings, and has a cross sectional area corresponding substantially with the upper or crown portion of the interior of the tire casing 19. The bag 5 may be constructed of one or more plies, preferably at least two plies, of rubberized cord fabric, the rubber thereof preferably being of an age-resistant synthetic variety. The relatively inextensible stretch-resisting members 6 may be bias cord fabric; however, they preferably extend in a substantially radial direction so that they will permit relatively free expansion of the diameter of the air bag without permitting appreciable expansion of the cross sectional length of the side wall thereof. Means such as a stem 36 having a passageway for supplying an inflation fluid between the conduit 37 and the annular oblong cavity within the air bar 5 is provided. The conduit 37 is connected to a source (not shown) for inflation fluid.

The collapsible backing member preferably has a rigid annular, relatively wide and preferably flat backing portion 4 of substantially larger diameter than the diameter of the beads of the tire 19. The outer peripheral surface of the backing is at least one-half the internal tire width and is preferably substantially the same width. The backing member preferably may have a plurality of rigid sections capable of being assembled together to form a rigid annulus, or it may, of course, be a pneumatic tube of stretch-resistant walls which when in use is maintained at higher pressure than is the air bag 5, to provide greater rigidity. As shown in the drawings, each section consists of a stiffening portion 3, and a relatively flat, annular backing portion 4. The intermediate sections 4a may be hinged or pivotally connected to end sections 4b.

A key section 4c having a suitable opening 42 to receive the valve stem 36 is provided for supplementing the hinged sections and cooperating with them in forming the backing member in rigid annular form. Means such as bolts 43 and 44 at the line of junction of the respective end portions 4b with the key section 4c are provided for locking the key section in place, thus preventing collapse of the backing member when inflation fluid is applied within the air bag 5.

In operation the apparatus of the present invention is preferably suspended vertically as shown in Fig. 1. This may be conveniently accomplished by providing suitable supports having arms 45 with a groove 46 to receive the stiffening portion 3 of the backing member. The arms 45 are anchored to a rigid structure, not shown.

In retreading tires with the apparatus of the present invention, tread material 20 is applied to the outer portion of the casing 19 in suitable form—preferably in the form of camel-back of conventional width. The tire casing is then incorporated within the mold 2, as shown in Figs. 1 and 2. This may be readily accomplished after the outer diameter of the tire is sufficiently reduced by either spreading the beads or by spreading the midportions of the side walls of the tire. The air bag 5 is then inserted and the backing member assembled in annular form within the casing and between the beads thereof. The air bag is thus retained in a flat elongated shape in the upper or crown portion of the tire between the crown of the tire and the annular portion 4 of the backing member.

Since the side walls of the air bag are relatively inextensible radially, the inflation pressure within the annular cavity of the bag 5 causes the bag to tend to assume a more rounded shape, rather than to extend the side walls of the tire outwardly. The entire tread portion of the tire is thus pressed toward the internal surface of the mold without tending to further separate the side walls. It is thus seen that no side members are required to press the side edges of the mold inwardly toward each other so as to raise the shoulder portions of the tire against the edges of the forming mold.

Since only cross sectional extensibility of the preferred air bags is limited by radial cords 6, it is seen that the same air bag is suitable for a large number of sizes of tire casings. The backing and mold members may also be used for the retreading of casings of various sizes, if desired. Since side plates and also rims to fit closely onto the beads of the tire are avoided in accordance with the present invention, a substantial savings in labor cost is had.

As set forth above, the air bag 5 contains inextensible, stretch-resisting elements 6 which extend in a radial direction to prevent appreciable expansion of the cross sectional wall thereof, but which permits longitudinal wall expansion and increase in diameter of the total air bag. In the claims, therefore, the terms "stretching in a cross sectional direction" or "stretching in cross section" are intended to mean enlarging of the axial cross section of the air bag. "Cross section" as used herein is intended to designate a section produced by an axial plane of limited extent and passing through only one-half of the torus, as on the line between points 2—2 of Fig. 1, rather than the section cut by an axial plane of unlimited extent and passing entirely through the torus.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A tire retreading mold matrix comprising an outer substantially continuous cylindrical sheet metal member, an inner continuous tread-forming member welded at spaced points intermediate its side edges to said outer member and having inwardly projecting tread-forming portions of hollow, generally U-shaped cross section, integral, inturned annular flanges at the side edges thereof, means for supplying heating fluid interiorly of said hollow tread-forming portions, venting holes through said welded portions, a header connecting the space between said inner and said outer members of said mold to permit heating fluid to enter said space, and a discharge header also connecting the space between said inner and said outer members to permit discharge of fluid therefrom and means for supplying fluid to said space.

2. A tire retreading mold matrix comprising an outer, substantially continuous, cylindrical sheet metal member, an inner, continuous tread-forming member welded to said outer member at spaced points between the side edges thereof and having inwardly projecting tread-forming portions of hollow, generally U-shaped cross section and integral inturned annular flanges at the side edges thereof, venting holes through at least some of said welded portions, a header connecting space between said inner and said outer members of said mold to permit heating fluid to enter said space, a discharge header connecting the space between said inner and said outer members to permit discharge of fluid therefrom.

3. A tire retreading mold matrix comprising an outer, substantially continuous, cylindrical sheet metal member, an inner, continuous tread-forming member having inwardly projecting tread groove-forming portions of hollow, generally U-shaped cross section and welded to the outer member at spaced points between said tread groove-forming portions, and internal, inturned annular flanges at the side edges thereof, venting holes through at least some of said welded portions, and means for supplying heating fluid to the space between said inner and outer members of said mold matrix.

HERMAN T. KRAFT.